United States Patent
Bae et al.

(10) Patent No.: US 7,409,230 B2
(45) Date of Patent: Aug. 5, 2008

(54) METHOD FOR PROVIDING AN OCCASION DATE NOTIFICATION FUNCTION IN A PHONE

(75) Inventors: Jong-Cheol Bae, Daegu-Kwangyokshi (GB); Keon-Young Park, Kumi (GB)

(73) Assignee: Samsung Electronics Co., Ltd (KR)

( * ) Notice: Subject to any disclaimer, the term of this patent is extended or adjusted under 35 U.S.C. 154(b) by 485 days.

(21) Appl. No.: 09/929,890

(22) Filed: Aug. 15, 2001

(65) Prior Publication Data

US 2002/0086712 A1    Jul. 4, 2002

(30) Foreign Application Priority Data

Dec. 29, 2000   (KR) .............................. 2000-86193

(51) Int. Cl.
*H04B 1/38* (2006.01)
*H04M 1/00* (2006.01)
*H04M 1/64* (2006.01)

(52) U.S. Cl. ........................ 455/566; 455/567; 379/82

(58) Field of Classification Search .............. 379/88.13, 379/52, 88.12, 374.01, 374.02, 375.01, 82; 455/566, 575, 414.1, 567
See application file for complete search history.

(56) References Cited

U.S. PATENT DOCUMENTS

| | | | | |
|---|---|---|---|---|
| 5,870,683 A * | 2/1999 | Wells et al. | .................. | 455/566 |
| 5,907,604 A * | 5/1999 | Hsu | ....................... | 379/142.06 |
| 6,363,259 B1 * | 3/2002 | Larsen | .................... | 455/550.1 |
| 6,377,664 B2 * | 4/2002 | Gerszberg et al. | ......... | 379/88.13 |
| 6,411,827 B1 * | 6/2002 | Minata | ........................ | 455/566 |
| 6,443,796 B1 * | 9/2002 | Shackelford | ................. | 446/91 |
| 6,449,498 B1 * | 9/2002 | Kirbas et al. | ................. | 455/566 |
| 6,459,906 B1 * | 10/2002 | Yang | ........................... | 455/566 |
| 6,490,343 B2 * | 12/2002 | Smith et al. | .................... | 379/52 |
| 6,529,742 B1 * | 3/2003 | Yang | ........................ | 455/556.1 |
| 6,606,508 B2 * | 8/2003 | Becker et al. | ................ | 455/567 |

(Continued)

FOREIGN PATENT DOCUMENTS

DE    101 44 354.4-31    3/2006

(Continued)

OTHER PUBLICATIONS

Jung, Y H, 'Caller Identification Service Method For Telephone', 2003, Derwent Publication.*

(Continued)

*Primary Examiner*—Lisa Hashem
(74) *Attorney, Agent, or Firm*—The Farrell Law Firm, PC

(57) ABSTRACT

There is provided a method of alerting a user of an occasion date in a phone having an idle mode screen displaying function and an incoming call ring sound alteration function. It is first determined whether today is a registered occasion date. If today is not the registered occasion date, a first predetermined image is set for an idle mode screen and a first predetermined ring sound is set as an incoming call ring sound. On the other hand, if the today is the registered occasion date, the first predetermined image is changed to a second predetermined image for the idle mode screen and the first predetermined ring sound is changed, to a second predetermined ring sound in place of the incoming call ring sound.

4 Claims, 3 Drawing Sheets

U.S. PATENT DOCUMENTS

| | | | |
|---|---|---|---|
| 6,628,971 B1 * | 9/2003 | Yoon et al. | 455/566 |
| 7,039,420 B2 * | 5/2006 | Koskinen et al. | 455/456.1 |
| 7,069,044 B2 * | 6/2006 | Okada et al. | 455/556.1 |
| 7,272,539 B2 * | 9/2007 | Sano | 702/189 |
| 2001/0050977 A1 * | 12/2001 | Gerszber et al. | 379/88.13 |
| 2002/0198017 A1 * | 12/2002 | Babasaki et al. | 455/550 |
| 2003/0087665 A1 * | 5/2003 | Tokkonen | 455/556 |
| 2003/0153337 A1 * | 8/2003 | Ito | 455/517 |
| 2004/0014459 A1 * | 1/2004 | Shanahan | 455/414.1 |
| 2004/0055011 A1 * | 3/2004 | Bae et al. | 725/62 |
| 2004/0056985 A1 * | 3/2004 | Seong | 348/838 |
| 2004/0255271 A1 * | 12/2004 | Lim | 717/110 |
| 2005/0261031 A1 * | 11/2005 | Seo et al. | 455/566 |
| 2006/0270461 A1 * | 11/2006 | Won et al. | 455/566 |

FOREIGN PATENT DOCUMENTS

| | | |
|---|---|---|
| EP | 0 814 442 | 12/1997 |
| EP | 814442 A2 * | 12/1997 |
| JP | 62128648 | 6/1987 |
| JP | 08154114 | 6/1996 |
| JP | 2000115302 | 4/2000 |
| JP | 2001320448 A * | 11/2001 |

OTHER PUBLICATIONS

Park, S Y, 'Automatically changing schedule alarming and incoming call notification signal, particularly for sounding the alarm when time for schedule which has been registered as occurring repeatedly by user arrives', 2006, Derwent Publication.*
Kazuyuki, Hanazono et al, 'Telephone Set', Jun. 1987, JPAB.*
Bunshi, Ichiyama et al., 'Telephone Set', Jun. 1996, JPAB.*

* cited by examiner

METHOD FOR PROVIDING AN OCCASION DATE NOTIFICATION FUNCTION IN A PHONE

PRIORITY

This application claims priority to an application entitled "Occasion Date Notification Method in Phone" filed in the Korean Industrial Property Office on Dec. 29, 2000 and assigned Ser. No. 2000-86193, the contents of which are hereby incorporated by reference.

BACKGROUND OF THE INVENTION

1. Field of the Invention

The present invention relates generally to a phone having an idle mode screen display function or a ring sound altering function, and in particular, to a method of alerting a user of an occasion date.

2. Description of the Related Art

Aside from basic functions such as wireless paging or telephone calls, a paging terminal and a mobile phone usually provide additional functions as an added convenience to the user. For example, a method of alerting a user of an occasion date by a paging terminal has been suggested. According to this method, a paging terminal plays a predetermined melody to alert a user of an occasion date at a designated time on the occasion day and its previous day, which is registered in a received message or by key manipulation of the user. A method of transmitting a commemorative message and commemorative music to a receiving terminal by an SMS (Short Message Service) on an occasion day or date has also been proposed. By utilizing the aforementioned method, a message management center of a base station automatically transmits a commemorative message and commemorative music to a receiving terminal, on an occasion day designated by a user.

The above two methods provide the function of alerting the user of an occasion date such as an anniversary. However, providing a user with a one time-notification alert such as an alarm may not help the user remember the occasion date.

SUMMARY OF THE INVENTION

It is, therefore, an object of the present invention to provide a method of notifying a user continuously and effectively of an occasion date.

The above and other objects are achieved by a method of alerting a user of an occasion date in a phone having an idle mode screen displaying function and an incoming call ring sound alteration function. It is first determined whether today is a registered occasion date. If today is not the registered occasion date, a first predetermined image is set for an idle mode screen and a first predetermined ring sound is set as an incoming call ring sound. On the other hand, if the today is the registered occasion date, the first predetermined image is changed to a second predetermined image for the idle mode screen and the first predetermined ring sound is changed to a second predetermined ring sound in the place of the incoming call ring sound.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
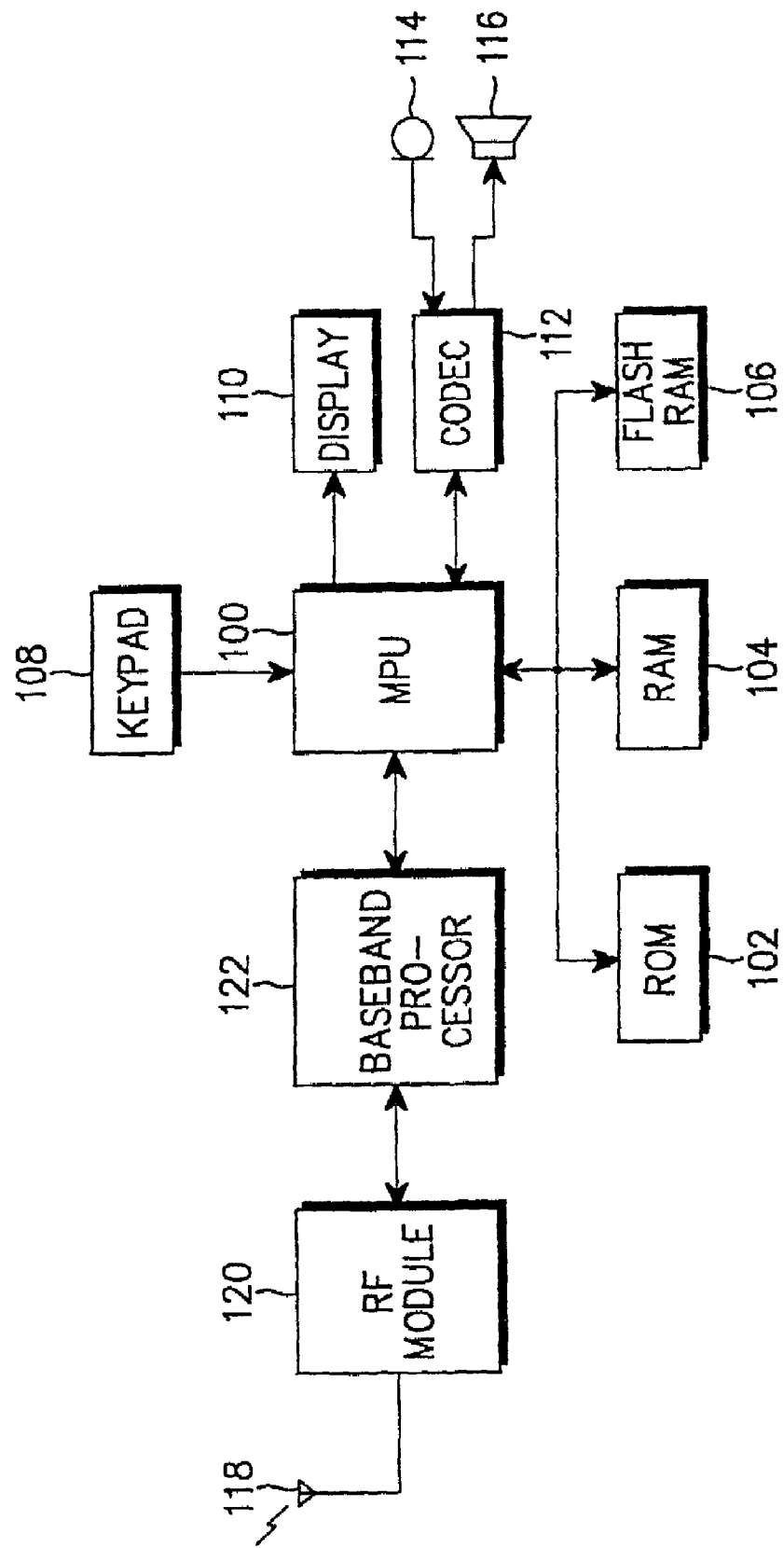
FIG. 1 is a block diagram of a mobile phone to which the present invention is applied.

FIG. 1 is a block diagram of a typical mobile phone with an idle mode screen display function and an incoming call ringing function, to which the present invention is applied. The mobile phone is comprised of: a Multi-Processor Unit (MPU) 100, a Read Only Memory (ROM) 102, a Random Access Memory (RAM) 104, a Flash RAM 106, a keypad 108, a display 110, a Coder-Decoder (CODEC) 112, a microphone 114, a speaker 116, an antenna 118, a Radio Frequency (RF) module 120 and a baseband processor 122. Referring to FIG. 1, MPU 100 processes an occasion date notification function, according to the present invention, in addition to the usual function of processing and controlling a phone call, data communication, or Internet access. The typical operation of the MPU 100 will not be described herein. ROM 102 stores micro-codes for control programs of the MPU 100 and reference data. RAM 104 acts as a working memory. Flash RAM 106 stores updatable data and is used to register an occasion date and store image data for an idle mode screen and incoming call ring sound data. Keypad 108 offers user key input to the MPU 100, including a plurality of digit keys and function keys. Display 110 displays image data, under the control of the MPU 100. CODEC 112 is connected to the MPU 100. Microphone 114 and speaker 116 are connected to the CODEC 112 and act as voice input/output blocks for telephone calls and voice recording. RF module 120 transmits/receives radio signals to/from a base station for a portable mobile phone via antenna 118. The RF module 120 modulates a transmission signal received from the MPU 100 through a baseband processor 122 and transmits the modulated RF signal through the antenna 118. The RF module 120 also demodulates an RF signal received through the antenna 118 and feeds the demodulated signal to the MPU 100 through the baseband processor 122. The baseband processor 122 processes a baseband signal transmitted between the RF module 120 and the MPU 100.

A user registers an occasion date worth memorizing in the mobile phone, according to the present invention. On the registered day, an incoming call ring sound indicating the occasion date is generated at every incoming call all day long and an image representing the occasion date is displayed on an idle mode screen.

Figure 2:
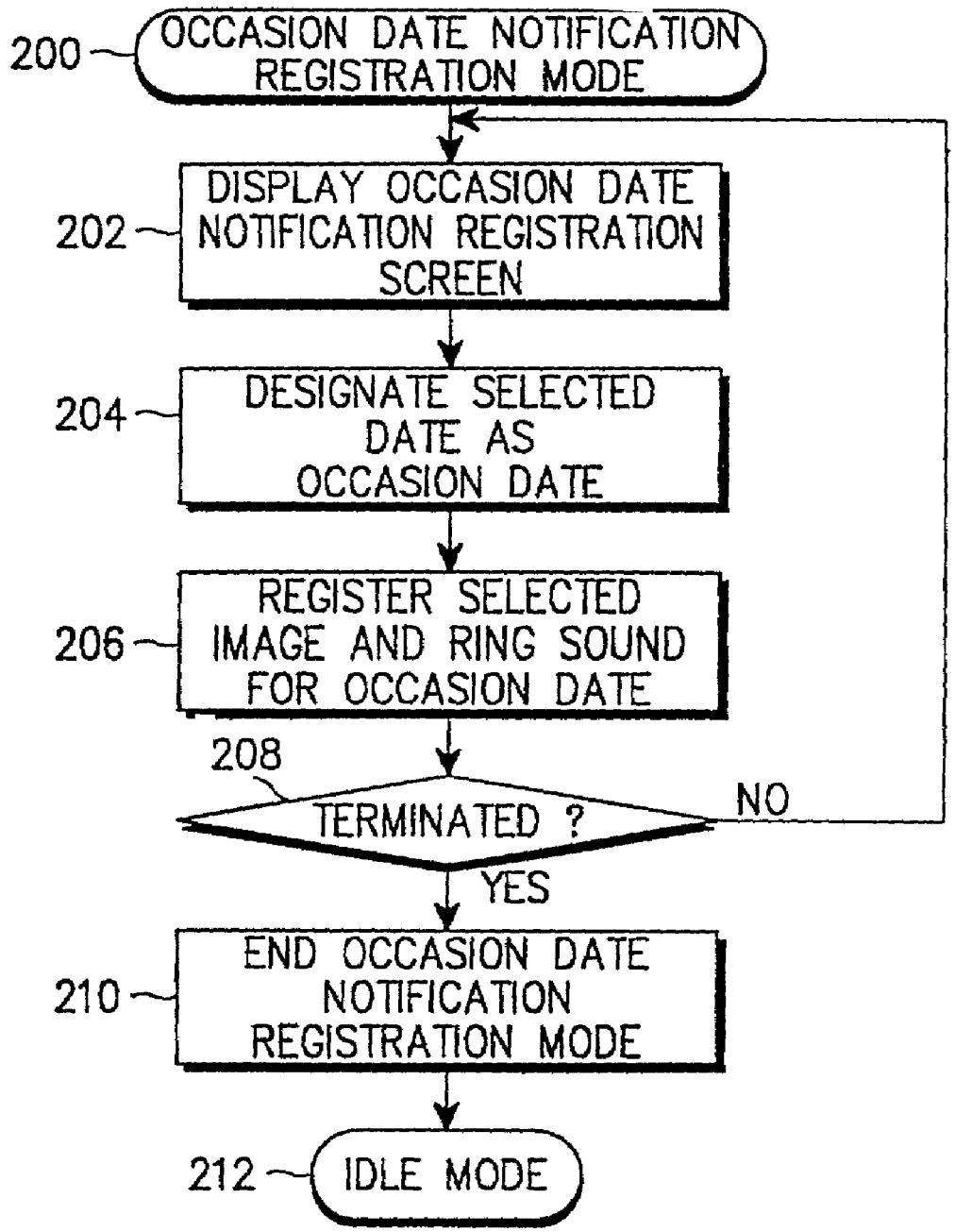
FIG. 2 is a flowchart illustrating an occasion date notification registration procedure, according to an embodiment of the present invention.

FIG. 2 is a flowchart illustrating a control operation for registering an occasion date notification function in the MPU 100, according to an embodiment of the present invention. If the user registers an occasion date, he selects an occasion date notification registration menu added to the existing menus by pressing a key in the keypad 108. Then, the MPU 100 enters an occasion date notification registration mode, in step 200. The occasion date notification registration mode can be selected by direct input of a hot key instead of menu selection.

A hot key is a specific key on keypad 108 that is utilized as an input key for the occasion date.

In step 202, the MPU 100 displays an occasion date notification registration screen on the display 110. The occasion date notification registration screen provides a menu by which the user can select an intended date, incoming call ring sound, and idle mode screen image. A database can be built with official memorial days and national holidays for each country and stored in the Flash RAM 106, so that the user can easily designate his country's memorial days and holidays as occasion dates. The user can build a database of the country's memorial days and holidays through the keypad 108, or download a database built in a PC (Personal Computer) from the PC to the mobile phone using a PC-link program.

The user designates a specific date as an occasion date or a registered occasion date, in step 204, and the MPU 100 registers an image and a ring sound selected by the user with respect to the occasion date, in step 206. Idle mode screen images are images displayed on a screen when an idle mode is set. A manufacturer stores idle modes/images in the Flash RAM 106, or the user downloads them and stores them in the Flash RAM 106. In particular, the user can download his intended images, for example, snow falling during Christmas and a birthday cake for his birthday and store them. Incoming call ring sounds are melodies that alert the user of incoming calls. The manufacturer stores the incoming call ring sounds in the Flash RAM 106 as usual, or the user downloads them. Especially, the user can download melodies that he wants to hear on his occasion days, for example, a carol for Christmas and a happy birthday song for his birthday.

If the user presses a key [END] or a predetermined input time elapses, in step 208, the MPU 100 ends the occasion date notification registration mode, in step 210, and then enters an idle mode, in step 212. If the occasion date notification registration mode is not terminated, then the MPU 100 returns to step 202.

Figure 3:
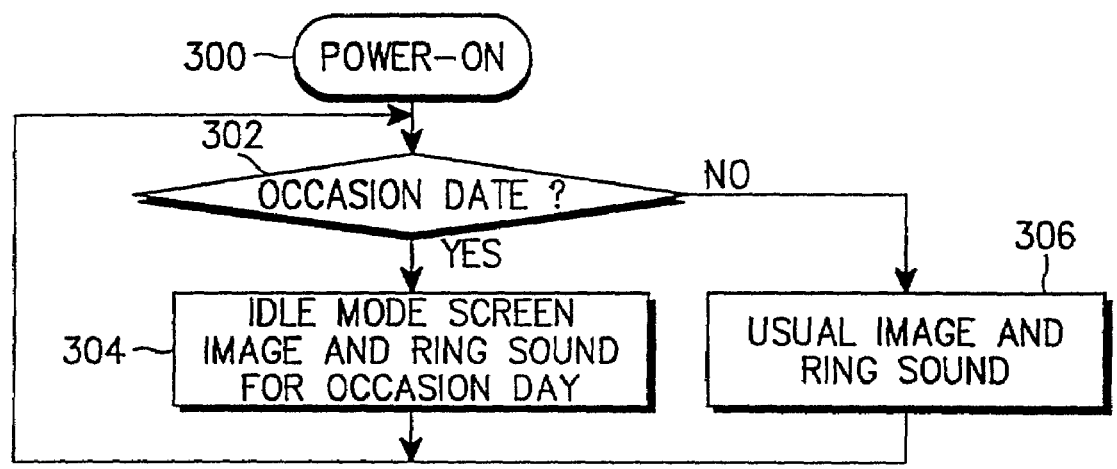
FIG. 3 is a flowchart illustrating an occasion date notifying procedure, according to the embodiment of the present invention.

FIG. 3 is a flowchart illustrating an occasion date notification procedure, according to the embodiment of the present invention. Referring to FIG. 3, if power is ON, in step 300, the MPU 100 checks whether a designated occasion date of a registered occasion date falls on today, in step 302. If today is not the occasion date, the MPU 100 sets a predetermined image as an idle mode screen image and a predetermined ring sound as an incoming call ring sound. Therefore, on a day other than the occasion day, the usual idle mode screen is displayed on the display 110, in an idle mode, and the usual ring sound is outputted when an incoming call is received. On the other hand, on the occasion day, the usual idle mode screen image is changed to an image designated for the occasion day and the usual incoming call ring sound is also changed to a ring sound registered for the occasion day, in step 304. Thus, the incoming call ring sound indicating the occasion date is outputted every time calls are incoming on the occasion day. In addition, the image indicating the occasion date is displayed on the idle mode screen. After the occasion day, the image and ring sound designated for the occasion day are changed to the usual image and ring sound, in step 306.

Consequently, continuous notification of the occasion date provided to the user gives the user more of a chance to enjoy his anniversary.

As described above, the present invention effectively alerts a user of an occasion date by generating an incoming call ring sound representing the occasion date and displaying an image representing the occasion date on an idle mode screen every time incoming calls are received on the occasion day.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of alerting a user of an occasion date when a call is received in a mobile phone having an idle mode screen displaying function, comprising:

selectively entering the occasion date and images from downloaded information or from said mobile phone;

accepting a call on the mobile phone, the call intended for the user;

determining whether today is the occasion date;

displaying a first image from said images for an idle mode screen on the phone, if today is not the occasion date; and changing the first image from said images to a second image from said images if today is the occasion date to remind the user of the occasion date.

2. The method of claim 1, further comprising:

registering an image selected by the user among idle mode screen images stored in the phone with respect to the occasion date.

3. A method of alerting a user of an occasion date when a call is received in a mobile phone having an idle mode screen displaying function and an incoming call ring sound alteration function, comprising:

selectively entering the occasion date, images, and ring sounds from downloaded information or from said mobile phone;

accepting a call on the mobile phone, the call intended for the user;

checking whether today is the occasion date;

displaying a first image from said images for an idle mode screen on the phone and playing a first ring sound from said sounds as an incoming call ring sound, if today is not the occasion date; and displaying a second image from said images and playing a second ring sound from said sounds as the incoming call ring sound, if today is the occasion date to remind the user of the occasion date.

4. The method of claim 3, further comprising:

registering an image and a ring sound selected by the user among idle mode screen images and ring sounds stored in the phone with respect to the occasion date.

\* \* \* \* \*